United States Patent
Faur et al.

(10) Patent No.: US 7,406,883 B2
(45) Date of Patent: Aug. 5, 2008

(54) COMPACT DEVICE FOR MEASURING THE SPEED AND THE DIRECTION OF ROTATION OF AN OBJECT

(75) Inventors: Marian Faur, Massy (FR); Jacques Sellin, Boissise le Roi (FR); Bernard Parmentier, Maurepas (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/521,912

(22) PCT Filed: Jun. 25, 2003

(86) PCT No.: PCT/EP03/50262

§ 371 (c)(1),
(2), (4) Date: Jan. 20, 2005

(87) PCT Pub. No.: WO2004/010089

PCT Pub. Date: Jan. 29, 2004

(65) Prior Publication Data

US 2005/0235761 A1  Oct. 27, 2005

(30) Foreign Application Priority Data

Jul. 23, 2002  (FR) .................... 02 09331

(51) Int. Cl.
*G01L 3/02* (2006.01)
(52) U.S. Cl. ............ 73/862.331; 73/488; 73/506; 73/507; 73/509; 73/514.39
(58) Field of Classification Search .......... 73/488, 73/862.331, 506, 507, 509, 514.39
See application file for complete search history.

(56) References Cited

U.S. PATENT DOCUMENTS

| 3,455,162 A | | 7/1969 | Michener et al. | |
| 3,636,767 A | | 1/1972 | Duffy | |
| 5,715,162 A | * | 2/1998 | Daigle | ............... 701/99 |

(Continued)

FOREIGN PATENT DOCUMENTS

DE  19618367 A  2/1997

(Continued)

*Primary Examiner*—Edward Lefkowitz
*Assistant Examiner*—Freddie Kirkland, III
(74) *Attorney, Agent, or Firm*—Bryan L. White; James Kurka; Darla Fanseco

(57) ABSTRACT

The invention concerns a device for measuring the speed and direction of rotation of an object (3) near to which it is placed. It comprises:
  a magnetic detection device (2) that delivers, in response to a rotation of the object (3) generating a magnetic field variation, signals representative of its speed and its direction of rotation,
  a conductor (4) intended to be connected to a power source to supply current to the magnetic detection device (2) at least,
  current receptor means (6) placed between the magnetic detection device (2) and the conductor (4) that create, from signals coming from said magnetic detection device (2), a modulation of the current (Iout) flowing in the conductor (4), said modulated current (Iout) reflecting both the speed and the direction of rotation of the object (3).

Application particularly in the oil industry.

19 Claims, 7 Drawing Sheets

U.S. PATENT DOCUMENTS 6,282,954 B1 * 9/2001 Ott et al. ................. 73/488
6,492,804 B2 * 12/2002 Tsuge et al. .............. 324/166
6,508,116 B1 * 1/2003 Adachi et al. ............ 73/170.02
6,542,847 B1 * 4/2003 Lohberg et al. ........... 702/148
6,630,821 B2 * 10/2003 Shinjo et al. ............. 324/207.21
6,859,000 B2 * 2/2005 Kessler et al. ............ 318/254
6,881,507 B2 * 4/2005 Milacic .................... 429/12
2001/0002791 A1 * 6/2001 Tsuge et al. .............. 324/174
2002/0149275 A1 * 10/2002 Gauthier et al. .......... 310/68 B

FOREIGN PATENT DOCUMENTS

| | | |
|---|---|---|
| DE | 10060621 A | 6/2001 |
| EP | 1074843 A | 2/2001 |
| WO | WO9949322 A | 9/1999 |

* cited by examiner

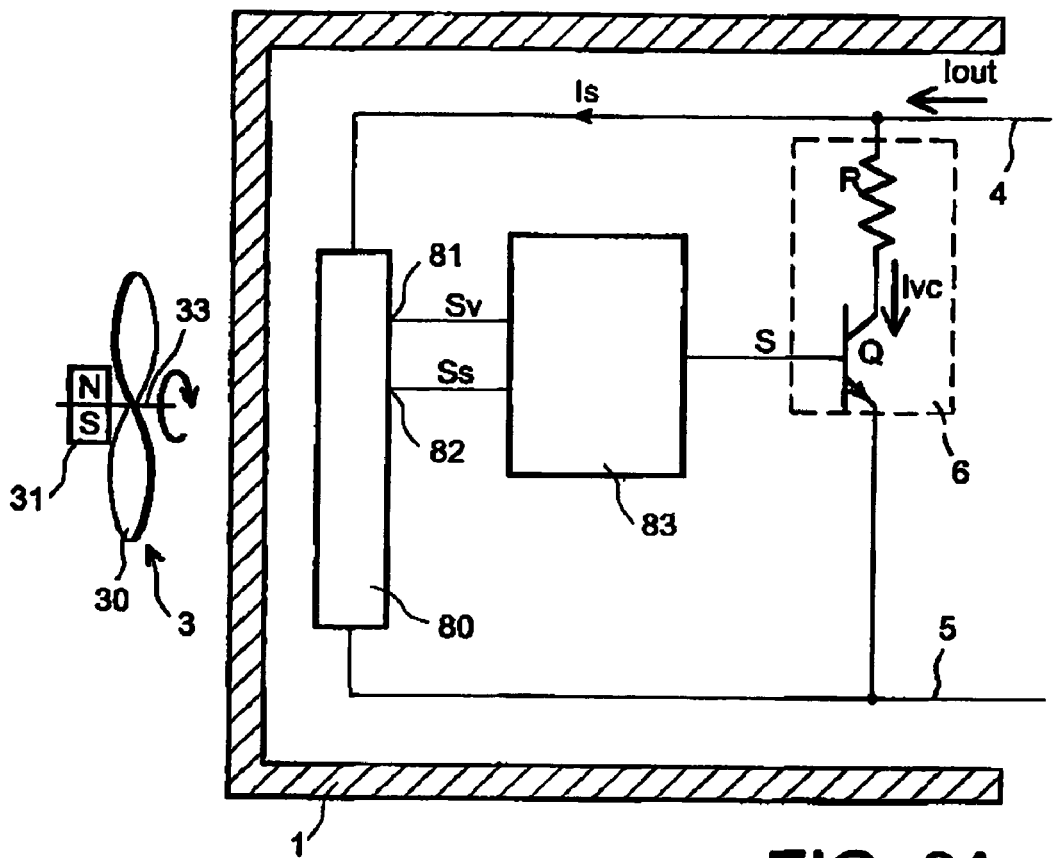
FIG. 8A
FIG. 8B
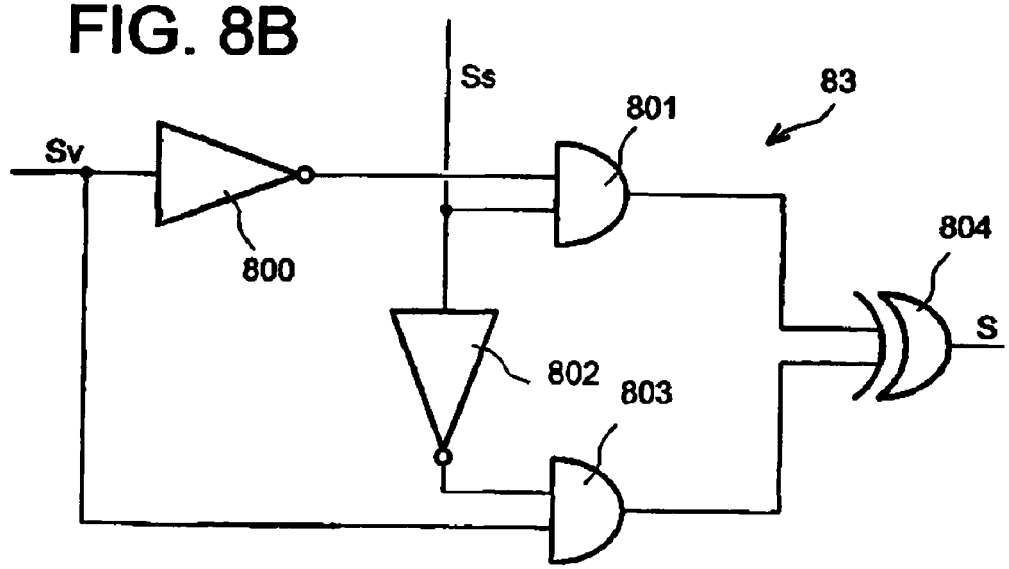

COMPACT DEVICE FOR MEASURING THE SPEED AND THE DIRECTION OF ROTATION OF AN OBJECT

TECHNICAL FIELD

The present invention concerns a compact device for measuring the speed and direction of rotation of an object (3). Said device is suited to operating in severe environments: under high pressure, at high temperatures and in the presence of corrosive fluids, for example. Its application may in particular be in the oil, nuclear, robotics, automobile sectors, etc.

In the oil sector, a surveillance of hydrocarbon producing wells is carried out. In order to do this, one seeks to acquire, in as precise a manner as possible, a certain amount of data concerning the multiphase fluid that flows in the well. This data is for example the nature, the flow rate and the proportion of the different phases of the fluid.

In the automobile sector, one seeks for example to find out the speed and the direction of rotation of the wheels of a vehicle in order to activate or not the wheel antiblocking system.

STATE OF THE PRIOR ART

We will now return to the oil sector. In a hydrocarbon production well, one is generally confronted with a triphasic flow formed of oil, gas and water. These fluidic phases do not have the same density, do not move at the same speed, are not present in the same proportions and do not enter into the well at the same location. The distribution of the different phases of the fluid in flow is not the same depending on whether the well is vertical, inclined or horizontal. In fact, due to the difference in the density of the different phases of the fluid, said phases become stratified progressively as the inclination of the well increases. In a same section of a well that is inclined or even horizontal, one can be confronted with several phases that move at different speeds and not always in the same direction.

In order to determine the nature of the fluidic phases in the well and their proportions, one may use optical sensors and/or resistivity sensors. One may also use nuclear capacity or density measurements.

In order to determine the speed and the direction of rotation of the flows in the well, one provides several propellers in the well, where each is intended to turn, driven by the fluid in which it is immersed. One combines this propeller with a device for measuring the speed and direction of rotation in order to be able to acquire the values of these parameters. It is preferable that this combination is without any contact in order to avoid disrupting the free movement of the propeller. With at least one magnet integral with the propeller, its rotation generates a magnetic field variation that one or several magnetic sensors can detect. This magnetic field variation is representative of the speed and the direction of rotation of the propeller.

Another constraint that must be respected is that the device for measuring the speed and direction of rotation is provided with a number of conductors, to connect to the exterior, and as small as possible.

In fact, said device for measuring the speed and direction of rotation must, firstly, be supplied with energy and, secondly, deliver signals corresponding to the measurements that it carries out. The power source may be placed on the surface or in a leaktight enclosure placed in the well near to the measuring device. A device for processing the signals delivered by the measuring device is also placed in said enclosure. One also places in said enclosure a device for processing the signals delivered by the optical and/or resistivity sensors. Within said enclosure there is a pressure different to that of the well, and it is generally atmospheric pressure. Leaktight passages must be provided for the conductors that connect the sensors and the device for measuring the speed and direction of rotation to the processing devices and the power source. Forming these leaktight passages is always awkward and it is best not to multiply their number due to the cluttering they cause and in order not to favour leaks.

In a nuclear application, one also needs to minimise the number of conductors combined with the measuring device, if said measuring device is placed in a radioactive enclosure.

Several types of magnetic movement sensors capable of measuring a speed and/or a direction of rotation are available commercially. Without going into details of the operating principle of said sensors, whether they are Hall effect sensors, magnetoresistance sensors or giant magnetoresistance sensors, they can be classified into two main categories.

The first category covers linear type sensors. A sensor in this category comprises at least a sensitive part that is sensitive to the intensity of a magnetic field. Its output delivers analogue signals at relatively low voltage. Said signals are proportional to the intensity of the magnetic field. This type of sensor is traditionally connected to a circuit for processing said signals. Said circuit is rather complex; it comprises amplifiers, comparators, integrated current sources and voltage control circuits, in such a way as to provide appropriate signals. In order to be of small size, this complex circuit must take the form of a specific integrated circuit known by the abbreviation ASIC (Application Specific Integrated Circuit), which considerably increases the development costs and the cost price of the component when it can only be manufactured in small quantities. The number of conductors attached to this type of device is at least three, but traditionally there are more.

The second category covers digital, or all or nothing, type sensors. These mass produced sensors comprise at least one sensitive part and an electronic circuit delivering digital information. They deliver a signal when they detect a certain magnetic field threshold. Without concerning ourselves with their temperature performance, which is not always optimal, this type of speed sensor often does not allow a detection of the direction, and when they do allow it, they are provided with at least four conductors. Moreover, if the rotation speed is low, the resolution of the measurement of the speed is not good, the delivered signal generally comprises two impulsions per rotation of the object when one combines the object with a single magnet. If one were to use more magnets, one would increase the cluttering of the object in rotation, which is not always possible and one would have to bring closer the sensor of the object in rotation due to the closing of the magnetic field lines from one magnet to another.

DESCRIPTION OF THE INVENTION

The specific aim of the present invention is to propose a device for measuring the speed and direction of rotation of an object, which does not have the above-mentioned disadvantages. It consists in a device for measuring the speed and direction of rotation of an object that is particularly compact, which is suited to operating in severe environments and which has the lowest possible number of electrical conductors for its power supply and the transmission of the information that it delivers. Said device has to operate without contact with the object in movement.

In order to attain the objectives, the present invention uses a magnetic detection device combined with current receptor means that create, on the power supply conductor of the magnetic measuring device, a modulation of the current flowing therein. The modulation is carried out in such a way as to encode both the information relating to the speed and to the direction of rotation of the object. Thus, the current consumed by the device for measuring the speed and the direction of rotation conveys the sought after information.

More precisely, the present invention concerns a device for measuring the speed and direction of rotation of an object near to which it is placed. It comprises:
- a magnetic detection device that delivers, in response to a rotation of the object generating a magnetic field variation, signals representative of its speed and its direction of rotation,
- a conductor intended to be connected to a power source to supply current to the magnetic detection device at least,
- current receptor means placed between the magnetic detection device and the conductor that create, from signals coming from the magnetic detection device, a modulation of the current flowing in the conductor, said modulated current reflecting both the speed and the direction of rotation of the object.

The current receptor means may comprise at least one series assembly formed of a resistor and a commutation element, for example a transistor.

The frequency of the modulated current or the number of transitions that it has reflects the speed of the object. Its form reflects the direction of rotation of the object.

The magnetic detection device may be a linear sensor delivering two pairs of signals out of phase with each other, said signals being relative to the angular position of the object.

The measuring device may comprise two comparators, the input of each receiving the signals of a pair, the output of each comparator being connected to the conductor via a resistor of a series assembly, the two resistors having different values.

In a preferred configuration, each comparator includes an element for commutating the current receptor means.

The modulated current may have a first asymmetric form when the object turns in one direction and the same form but seen in a mirror when the object turns in the other direction.

In another configuration, the magnetic detection device is a digital sensor delivering a signal representative of the speed and a signal representative of the direction of rotation of the object.

The modulated current may have a cyclic ratio greater than a predetermined threshold when the object turns in one direction and a cyclic ratio less than the predetermined threshold when the object turns in the other direction.

The device for measuring the speed and direction of rotation of an object may comprise two comparators, the input of each receiving the signals of a pair, means of encoding the direction of rotation of the object, the input of which is connected to the output of the comparators, means of mixing, the input of which is connected to the output of the comparators and to the output of the means of encoding, the output of the means of mixing delivering a unique signal reflecting the speed and direction of rotation of the object, said unique signal controlling the current receptor means.

The means of encoding the direction of rotation may comprise a switchover D.

The device for measuring the speed and direction of rotation of an object may comprise means of mixing, the input of which is connected to the magnetic detection device and the output of which delivers a unique signal reflecting the speed and direction of rotation of the object, said unique signal controlling the current receptor means.

The means of mixing may be formed by a circuit based on logic gates.

The magnetic detection device, the conductor and the current receptor means at least may be encapsulated in an enclosure made out of non-magnetic material, the conductor being accessible from the exterior of said enclosure.

The enclosure may be formed out of metal such as titanium or stainless steel.

The magnetic detection device is connected to another conductor for its power supply, said other conductor remaining confined within the enclosure.

The present invention also concerns a magnetic system for acquiring data in a flow, particularly for hydrocarbon wells, which comprises a measuring device thus characterised, and of which the object takes the form of a non-magnetic propeller integral with at least one magnet.

In order to perturb the flow in which the propeller is immersed as little as possible, the propeller and the measuring device are placed in the same line as each other, along the axis of the rotation.

BRIEF DESCRIPTION OF THE DRAWINGS

The present invention will be more clearly understood on reading the description of the embodiments that are given, purely by way of indication and in nowise limitative, and by referring to the appended drawings in which:

FIG. 8A is an electrical diagram of another embodiment of a device for measuring the speed and the direction of rotation according to the invention.

FIG. 8B is an electrical diagram of the means of mixing that could be used in FIG. 8A.

Identical, similar or equivalent parts in the different figures described hereafter have the same number references in order facilitate going from one figure to another.

The different parts shown in the figures are not necessarily to a uniform scale, in order to make the figures easier to read.

DETAILED DESCRIPTION OF SPECIFIC EMBODIMENTS

Figure 1:
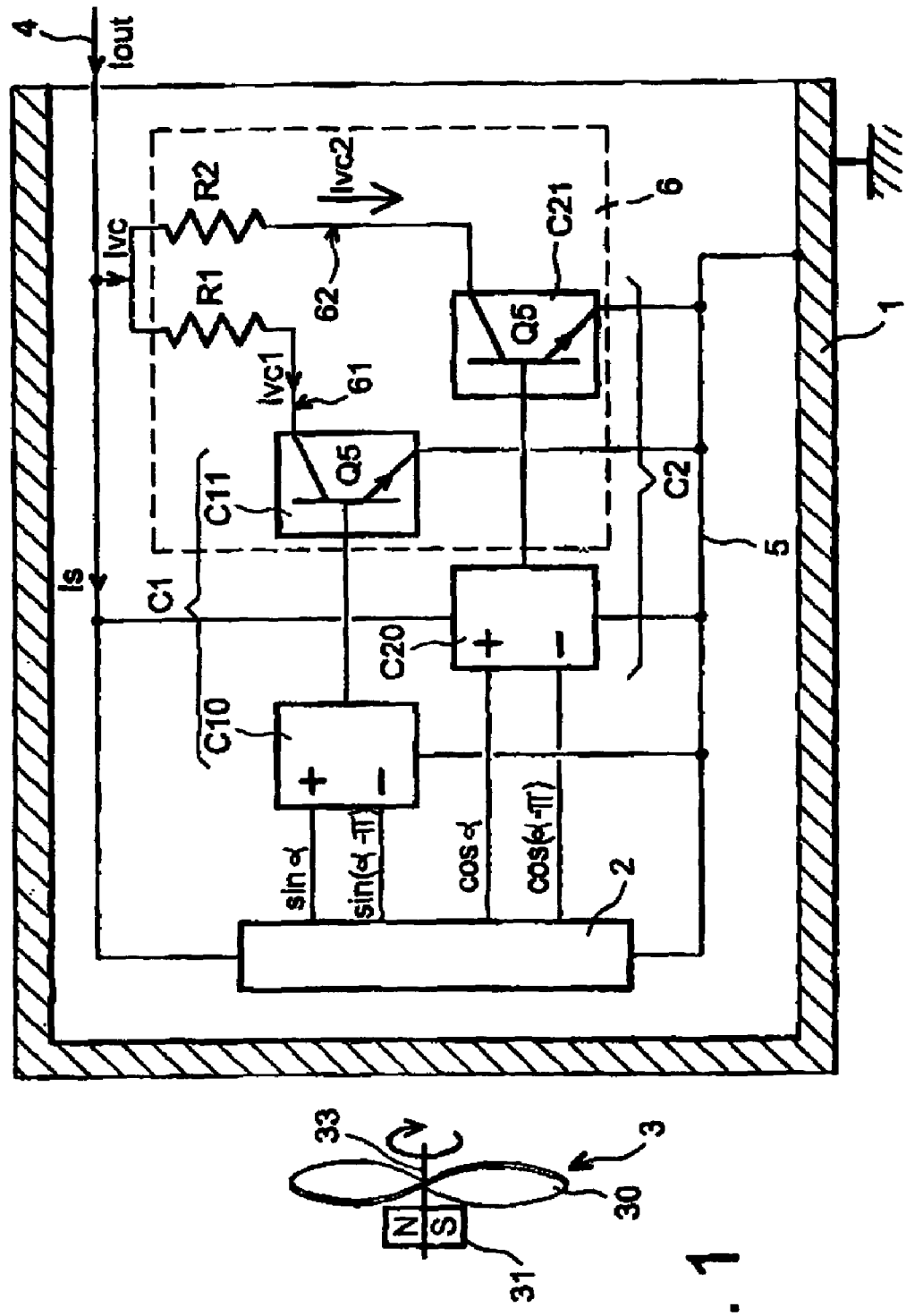
FIG. 1 is an electrical diagram of a first embodiment of a device for measuring the speed and the direction of rotation according to the invention.

We will refer to FIG. 1, which shows an electrical diagram of a device for measuring the speed and the direction of rotation of an object according to the invention. This configuration is a preferred configuration of the invention because it is particularly simple, compact and not expensive. One assumes that this device for measuring the speed and the direction of rotation is intended to be used in the hydrocarbon extraction field and, in this case, the object is a propeller integral with at least one magnet.

The device for measuring the speed and the direction of rotation comprises, within a non-magnetic metallic protective enclosure 1, a magnetic detection device 2 that delivers signals representative of the speed and the direction of rotation of an object 3 with which it co-operates, said object 3 while turning generating a magnetic field variation near to the magnetic detection device 2. The magnetic field variation is periodic when the rotation speed is substantially constant.

In our example, the propeller has the reference 30 and the magnet the reference 31. This enclosure 1 may also be used for a connection to earth as will be seen later and, in this case, it is formed out of an electrically conductive material.

In order to function, an electrical current must run through the magnetic detection device 2. It is intended to be connected to a power source (not represented) via an electrical power supply conductor 4. Said conductor 4, connected to the magnetic detection device 2, is accessible from the exterior of the protective enclosure 1. Said magnetic detection device 2 is also connected to another electrical conductor 5 for its power supply. Said other conductor 5 may also be connected to a second terminal (which is generally earth) of the power source for the return of the current and, in this case, it exits the protective enclosure 1 like the conductor 4. In a particularly interesting embodiment, said other conductor 5 remains confined within the protective enclosure 1 and is placed in electrical contact with the protective enclosure 1, which is generally connected to earth. More precisely, said protective enclosure 1 is placed in the body of a data acquisition device, in electrical contact with it, and it is the body of the device that is connected to earth. There is then only a single conductor 4 that exits the enclosure 1.

In order to make the signals delivered by the magnetic detection device 2 accessible without increasing the number of electrical conductors exiting the device for measuring the speed and direction of rotation of the object, said device for measuring the speed and direction of rotation of the object 3 comprises current receptor means 6 placed between the magnetic detection device 2 and the electrical conductor 4. Said current receptor means 6 receive the signals from the magnetic detection device 2, if appropriate after formatting, and create in the power supply conductor 4 a modulation of the amplitude of the current that circulates therein with the signals from the magnetic detection device. The current flowing in the power supply conductor 4 then conveys information relative to both the speed and the direction of rotation of the object.

Figure 2:
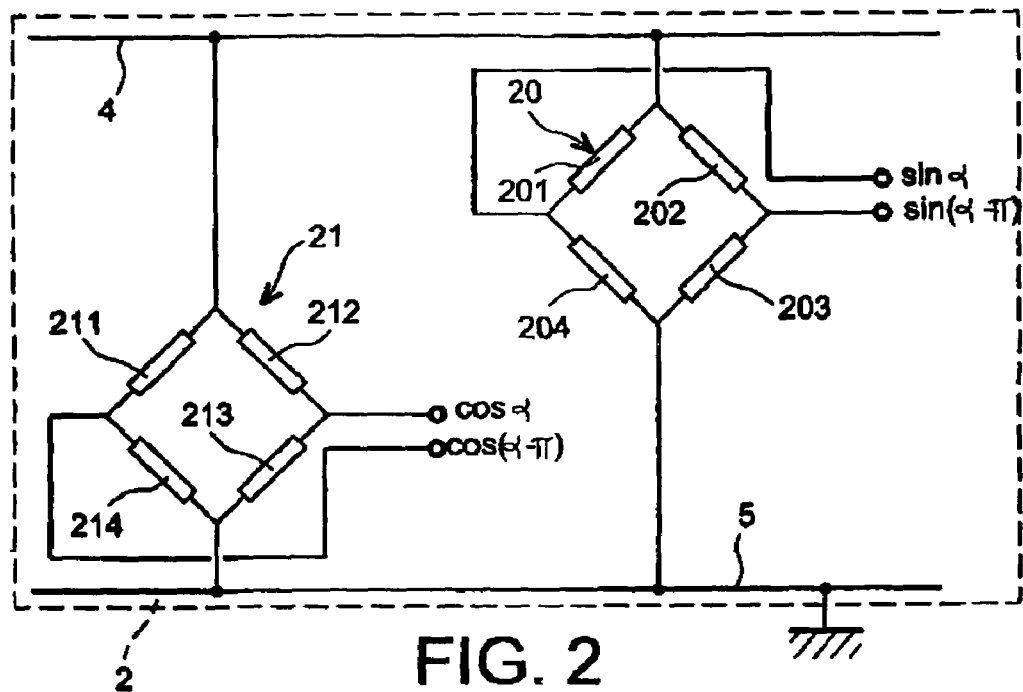
FIG. 2 is an electrical diagram of a magnetic detection device that could be used in FIG. 1.

In this embodiment, the magnetic detection device 2 is a magnetoresistance effect sensor of the category of linear sensors. It is in fact an angular position sensor. It delivers signals representative of the angular displacement $\alpha$ that exists between the turning magnetic field and a fixed reference direction (for example the direction of the current flowing in the elements that constitute the sensor). Its equivalent diagram is shown in FIG. 2.

In order to be able to detect two types of information, in other words the speed and the direction of rotation, one needs two sensitive cells that are going to deliver the out of phase signals, for example by $\pi/2$. In the embodiment described, the magnetic sensor 2 comprises a first sensitive cell 20 and a second sensitive cell 21, wherein said two sensitive cells are each configured with four magnetoresistance elements mounted in a bridge. The magnetoresistance elements are referenced 201 to 204 for the first sensitive cell 20 and 211 to 214 for the second sensitive cell 21. The resistance of said elements varies as a function of the intensity of the magnetic field. The first sensitive cell 20 delivers a pair of voltage signals in phase opposition, one proportional to $\sin \alpha$ and the other to $\sin(\alpha-\pi)$. The second sensitive cell 21 delivers a pair of voltage signals in phase opposition, one proportional to $\cos \alpha$ and the other to $\cos(\alpha-\pi)$.

The two sensitive cells 20, 21 are part of the same magnetic sensor which means that they have similar characteristics and more or less the same temperature behaviour.

Instead of using two sensitive cells of a same magnetic sensor, one could envisage using two distinct magnetic sensors. This configuration is less advantageous, since the measurements may be falsified, particularly as regards the direction of rotation, if the device for measuring the speed and the direction of rotation operates in an environment in which the temperature is subject to variation and if the sensors have different sensitivities.

Each pair of voltage signals is applied to the input of a comparator, said comparators are referenced C1 for the first pair and C2 for the second pair.

The output of the first comparator C1 is connected via a first calibration resistor R1 to the electrical conductor 4. The output of the second comparator C2 is connected via a second calibration resistor R2 to the electrical power supply conductor 4.

Said two calibration resistors R1 and R2 have different values. One may choose for example R2=2R1, where R1 is equal to one kilo Ohm. The resistance values are chosen as a function of the amplitude modulation of the current.

However, other values are possible. The comparators associated with the calibration resistors R1 and R2 encode the signals delivered by the angular position sensor 3.

Figure 3:
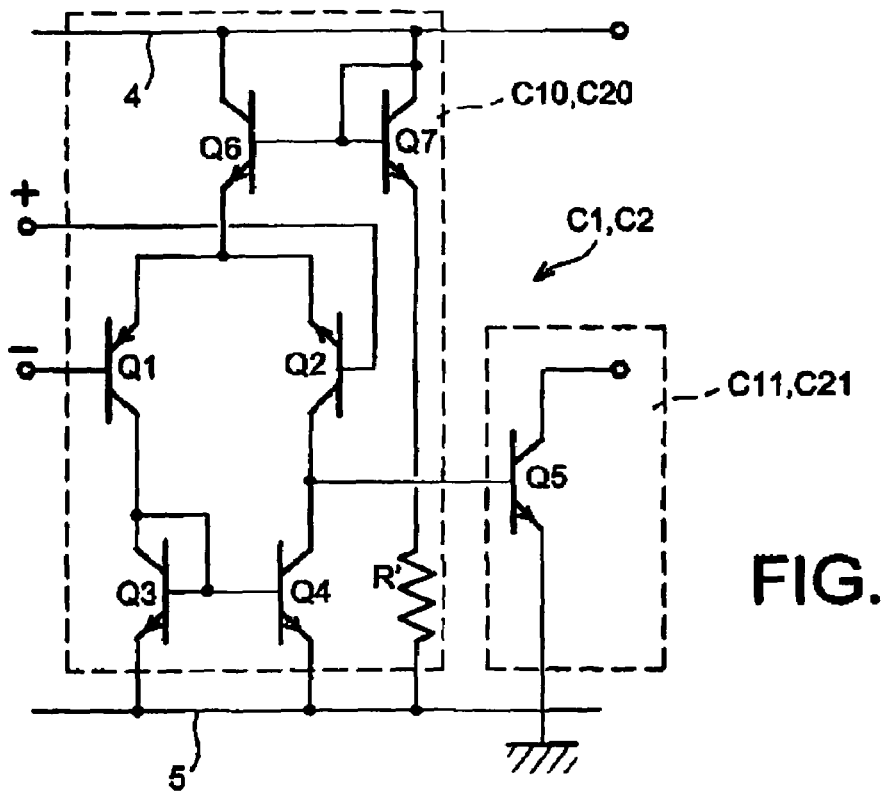
FIG. 3 is an electrical diagram of a comparator that could be used in FIG. 1.

The comparators C1 and C2 are conventional integrated comparators. A comparator has two output states; it delivers a high level voltage or a low level voltage and does this as a function of the signals that are applied to its inputs. A simplified diagram of the principle of a conventional comparator is shown in FIG. 3. It comprises as input stage a differential pair formed of the transistors Q1 and Q2. The inverting input is made on the base of the transistor Q1. The non-inverting input is made on the base of the transistor Q2. Said differential pair is placed between two supply terminals via, on one side a source formed of a current mirror comprising the transistors Q6 and Q7 and a polarisation resistance R' and, on the other, a charge formed of a current mirror comprising the transistors Q3 and Q4. It comprises an output stage formed of an open collector transistor Q5. Said transistor Q5 is an interrupter transistor. The output of the comparator is made on the collector of the transistor Q5.

In the device for measuring the speed and direction of rotation, it is therefore this collector that is connected to the conductor 4 via one of the calibration resistors R1, R2. The calibration resistors R1 and R2 replace the pulldown resistors that are traditionally used in the output of this type of comparator and which generally have values of around 10 kilo Ohms.

We will now recall the operation of the comparator. When the voltage applied to the non-inverting input is more positive than the voltage applied to the inverting input, the voltage on the base of the transistor Q5 drops and the transistor Q5 blocks. The voltage at the output of the comparator is taken to the high level; it is equal to the supply voltage. The pulldown resistor pulls down the output voltage of the comparator to the supply voltage when the transistor Q5 is blocked.

When the voltage applied to the non-inverting input is less positive than the voltage applied to the inverting input, the voltage on the base of the transistor Q5 increases and the transistor Q5 becomes saturated. The output voltage of the comparator is taken to the low level.

The comparators C1 and C2 represented in FIG. 1 may then be broken down into an input block C10, C20 comprising the differential pair, the charge and the source, said input block being followed by an output stage C11, C21 formed of the transistor Q5, in other words a commutation element.

The current receptor means 6 are then formed from two series assembles 61, 62, the first 61 comprising the output stage C11 of the comparator C1 and the resistor R1 in series, the second 62 comprising the output stage C21 of the comparator C2 and the resistor R2 in series.

Said current receptor means 6 are controlled by the voltages applied to the base of each of the transistors Q5 of the output stage C11, C21 of the two comparators C1, C2.

The current Iout flowing in the electrical power supply conductor 4 may be broken down into a supply current Is for the supply of the magnetic detection device 2 and the comparators C1, C2, a current Ivc absorbed by the current receptor means 6, said current Ivc itself broken down into a current Ivc1 absorbed by the first assembly 61 of the current receptor means 6 and a current Ivc2 absorbed by the second assembly 62 of the current receptor means 6.

Figure 4A:
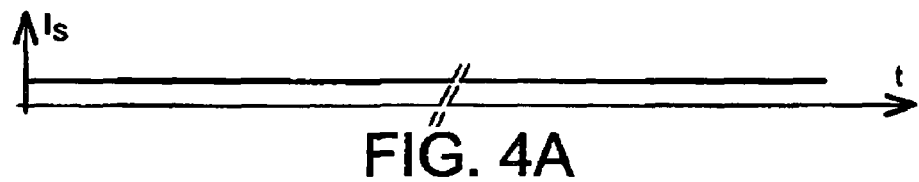
FIGS. 4A to 4D are timing diagrams of the components Is, Ivc1, Ivc2, Ivc, of the current Iout flowing in the conductor of the device for measuring the speed and the direction of rotation in FIG. 1, FIG. 4 E giving the shape of the current Iout.
Figure 4B:
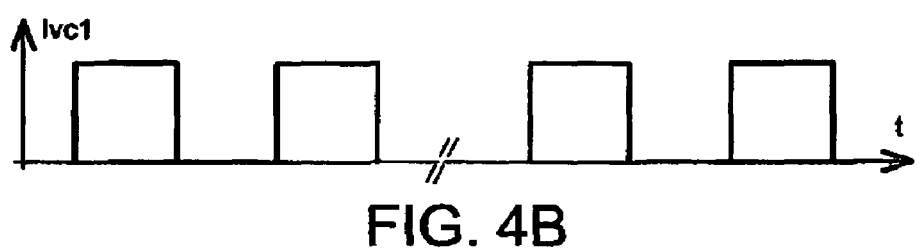
Figure 4C:
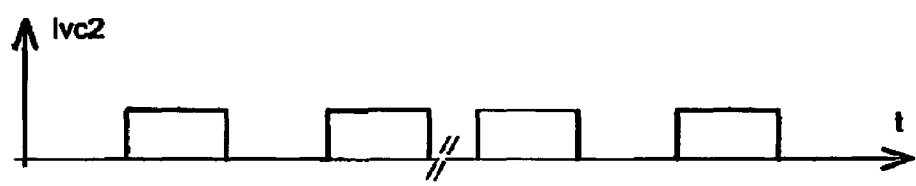
Figure 4D:
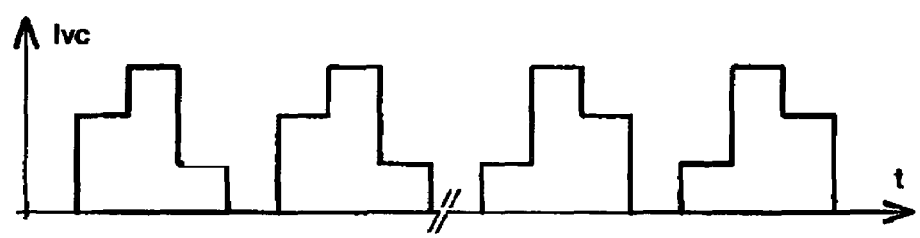

FIG. 4A schematically shows the shape of the current Is, FIG. 4B the shape of the current Icv1 and FIG. 4C the shape of the current Icv2 as a function of time. FIG. 4D shows the current Ivc absorbed by the current receptor means 6, which is the sum of the current Ivc1 and the current Ivc2. One assumes that the object 3 makes one turn in one direction and one turn in the other direction.

The supply current Is is substantially constant over time when the object 3 is driven in rotation. The currents Ivc1, Ivc2 are out of phase by $\pi/2$ since one reflects the sine and the other the cosine of a same angle. When the object turns in one direction, the current Ivc1 is in advance of the current Ivc2 and when the object 3 turns in the other direction it is the opposite. The amplitudes of the currents Ivc1 and Ivc2 are different since the calibration resistors R1 and R2 are different. The fact of choosing the resistor R1, R2 in a ratio of 2 enables the amplitude of one of the currents to be double the other current.

The current Ivc takes the form of an asymmetric signal in steps that are repeated twice for each turn of the object 3. It has a certain form when the object 3 turns in one direction and the same form but viewed in a mirror when the object 3 turns in the other direction. Its frequency or the number of transitions of the asymmetric signal reflects the speed of the object. The current reflects both the speed and the direction of rotation of the object 3.

Figure 4E:
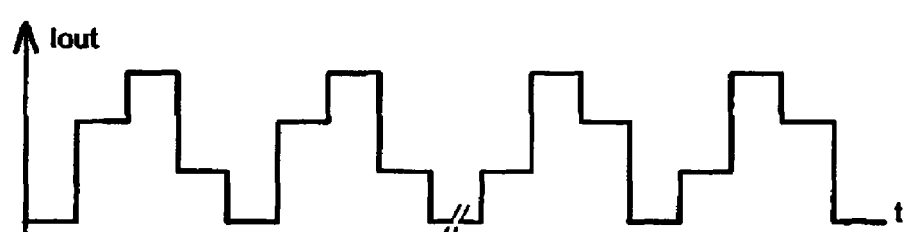

The current Iout is represented in FIG. 4E. It has the same characteristics as the current Ivc since the current Is has simply been added to it. It is thus the form of the current Iout absorbed by the device for measuring the speed and the direction of rotation that indicates the direction of rotation. The frequency of the current Iout indicates, for its part, the speed of rotation. The current Iout conveys information on both the speed and on the direction of rotation of the object 3.

The current Iout has 8 transitions per revolution of the object 3. Even if the object 3 turns at low speed, the current Iout has good speed resolution.

The device for detecting the speed and the direction of rotation does not need to be put in the presence of a stabilised magnetic field in order to operate correctly. The measurements that it takes are not affected by a temperature variation although they act on the intensity of the magnetic field and/or on the sensitivity of the magnetic sensor.

This type of device for measuring the speed and direction of rotation is not very sensitive to a slight variation in the relative position of the object in relation to the magnetic sensor due to the presence of the comparators C1 and C2, which each receive two signals in phase opposition from the same sensitive cell.

Figure 5:
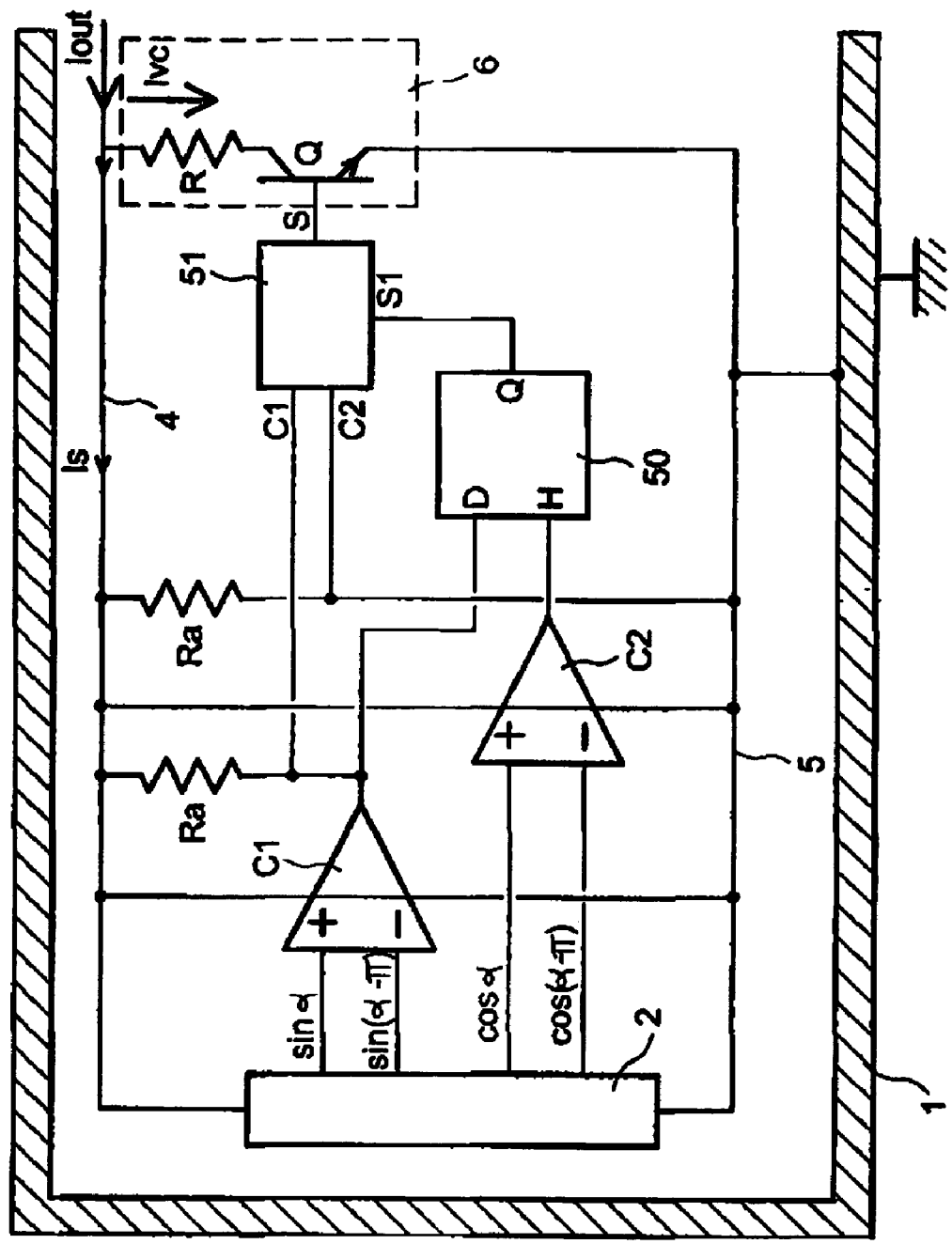
FIG. 5 is an electrical diagram of a second embodiment of a device for measuring the speed and the direction of rotation according to the invention.
Figure 5:
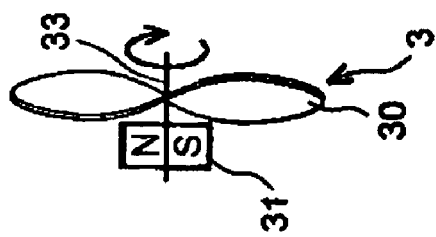

FIG. 5 shows, from a same magnetic sensor 2, another means of processing the signals that it delivers. The comparators C1 and C2, as shown in FIG. 1, are again represented. Their output is connected to the electrical supply conductor 4 via a pulldown resistor Ra. Now the comparators C1 and C2 are used in a conventional manner and no longer as current receptor means to modulate the current flowing in the power supply conductor 4. As previously, the comparators deliver signals in impulsions which have cyclic ratios near to 50%. They are only distinguished because they are out of phase by $\pi/2$. Their frequency is representative of the speed of rotation of the object.

In this configuration, one also finds the current receptor means 6 placed between the magnetic detection device 2 and the power supply conductor 4 to modulate the current flowing in the power supply conductor in order to reflect both the speed and the direction of rotation of the object.

However, now the current receptor means 6 are attacked by a unique signal S obtained from the signals delivered by the comparators C1, C2.

We will now see how to generate the unique signal S which conveys information on both the speed and the direction of rotation. We are first going to extract a signal S1 which directly reflects the direction of rotation. To do this, one uses means for encoding the direction of rotation 50 that may take the form of a switchover D. The output of the first comparator C1 is connected to the data input D of the switchover D, the output of the second comparator C2 is connected to the input H of the timer of the switchover D. The inverse is possible. The output Q of the switchover D emits the signal S1; it is high level when the object turns in one direction and low level when the object turns in the other direction.

One also provides means of mixing 51 combining the signals from the comparators C1, C2 (referenced respectively C1, C2 to simplify things) and the means of encoding the direction of rotation 50, in order to generate the unique signal S representative of both the speed and the direction of rotation of the object. Said signal S is intended to control the current receptor means 6 that are meant to modulate the current flowing in the conductor 4.

Said means of mixing 51 have an effect on the cyclic ratio. They deliver a signal having a cyclic ratio higher than the predetermined threshold when the object turns in one direction and a signal having a cyclic ratio less than the predetermined threshold when the object turns in the other direction. The frequency of said signal is directly representative of the speed of rotation of the object. The predetermined threshold is, in this configuration, equal to 50%.

Figure 6:
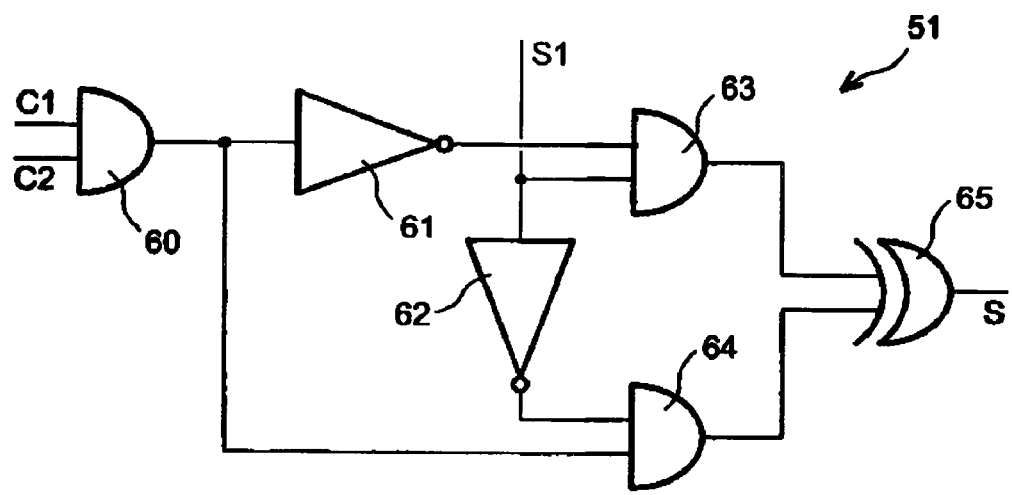
FIG. 6 is an electrical diagram of means of mixing that could be used in FIG. 1.
Figure 7A:
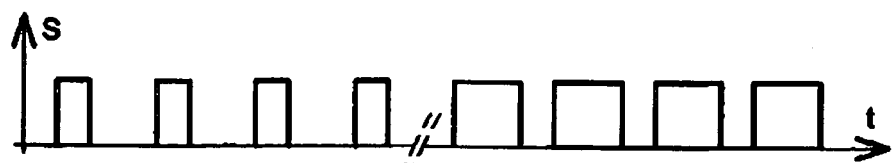
FIGS. 7A to 7D are timing diagrams of the signal S delivered by the means of mixing and the components Is, Ivc, of the current Iout flowing in the power supply conductor of the device for measuring the speed and the direction of rotation in FIG. 5, FIG. 7 D giving the shape of the current Iout.

Said means of mixing 51 may be formed by the logic circuit illustrated in FIG. 6. Said logic circuit comprises a first AND gate 60, one input of which is connected to the output of the first comparator C1 and the other input of which is connected to the output of the second comparator C2. The output of the first AND gate 60 is connected to the input of a first inverter 61. The output of the first inverter 61 is connected to one of the inputs of a second AND gate 63. The other input of the second AND gate 63 is connected to the output of the means of encoding the direction of rotation 50. The output Q of the means of encoding 50 is also linked to the input of a second inverter 62. The output of the second inverter 62 is connected to one of the inputs of a third AND gate 64. The other input of the third AND gate 64 is connected to the output of the first AND gate 60. The output of the second AND gate 63 is connected to one of the inputs of an exclusive OR gate 65. The other input of the exclusive OR gate 65 is connected to the output of the third AND gate 64. The output of the exclusive OR gate 65 delivers the unique signal S reflecting both the speed and the direction of rotation of the object. Such a signal S is illustrated in the diagram of FIG. 7A. In the first segment, the signal S has a cyclic ratio less than 50%; this signifies that the object turns in one direction. In the second segment, the signal S has a cyclic ratio greater than 50%; this signifies that the object turns in the other direction. The frequency of said signal S is directly representative of the speed of the object.

Said unique signal S is applied to the input of the current receptor means 6 intended to modulate the current Iout flowing in the electrical conductor 4. Said current receptor means 6 are formed by a commutation element Q represented in the form of a transistor whose base is connected to the output of the means of mixing 51, the collector of which is connected to the conductor 4 via a resistor R and the emitter of which is connected to the other conductor 5.

Figure 7B:
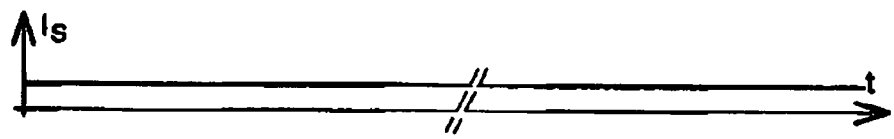
Figure 7C:
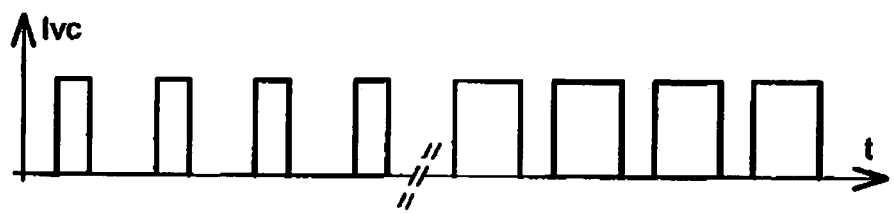
Figure 7D:
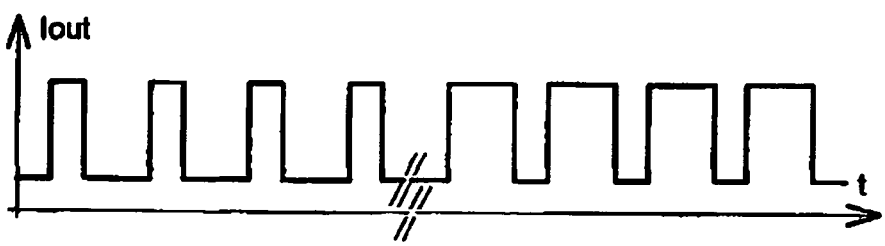

The current Iout flowing in the electrical conductor 4 may be broken down into a supply current Is of the magnetic detection device 2 and the electronic situated upstream of the current receptor means 6 and a current Ivc absorbed by the current receptor means 6 when they are controlled by the signal S. The diagram in FIG. 7B shows the shape of the current Is, the diagram in FIG. 7C shows the shape of the current Ivc, its form is traced over that of the signal S. The diagram in FIG. 7D shows the shape of the current Iout.

Instead of using a linear magnetic sensor type of magnetic detection device, it is possible to use a commercially available digital magnetic sensor 80 having an output 81 delivering a signal Sv directly reflecting the speed of the object 3 and an output 82 delivering a signal Ss directly reflecting the direction of rotation of the object 3. This embodiment is represented in FIG. 8A. The magnetic sensor may be a Hall effect magnetic sensor or a giant magnetoresistance magnetic sensor.

The two outputs of the magnetic sensor are connected to the means of mixing 83 to generate the unique signal S representative of both the speed and the direction of rotation of the object 3, said unique signal S being intended to control the current receptor means 6 meant to modulate the current flowing in the power supply conductor 4.

Said means of mixing 83 may be comparable to those in FIGS. 5 and 6 and carry out an encoding of the signals applied at its input on the basis of a cyclic ratio.

FIG. 8B shows an embodiment of the means of mixing 83. It involves a logic circuit comprising a monostable 85 whose input is connected to the output 81 of the magnetic sensor 80 (the one that delivers the signal Sv). The monostable 805 is used to break up the symmetry of the signal Sv which has a cyclic ratio equal to 50%. It generates impulsions of controlled width in order to obtain a signal having a cyclic ratio different to 50%. The output of the monostable 805 is connected to the input of a first inverter 800. The output of the first inverter 800 is connected to one of the inputs of a first AND gate 801. The other input of the first AND gate 801 is connected to the output 82 of the magnetic sensor 80 (the one that delivers the signal Ss).The output 82 of the magnetic sensor 80 is also connected to the input of a second inverter 802. The output of the second inverter 802 is connected to one of the inputs of a second AND gate 803. The other input of the second AND gate 803 is connected to the output 81 of the magnetic sensor 80. The output of the first AND gate 801 is connected to one of the inputs of an exclusive OR gate 804. The other input of the exclusive OR gate is connected to the output of the second AND gate 803. The output of the exclusive OR gate delivers the unique signal S reflecting both the speed and direction of rotation of the object. When it has a cyclic ratio less than 50% for example, it signifies that the object is turning in one direction. When it has a cyclic ratio greater than 50% for example, it signifies that the object is turning in the other direction. The frequency of said unique signal S is directly representative of the speed of the object. Said unique signal S is used to control the current receptor means 6 which take the same form as that shown in FIG. 5. Another difference of the device for measuring the speed and direction of rotation in FIG. 8A is that the other conductor 5 is also accessible from the exterior of the protective enclosure 1. Said other conductor 5 is no longer confined within the protective enclosure 1.

The protective enclosure 1 may be made out of a non-magnetic material that is resistant to the environment in which it is going to be immersed.

In an oil application, the fluid is around 150° C., its pressure around $10^8$ Pa and it may be very corrosive. It may contain sulphurous compounds, sand or other debris in suspension, etc. The protective enclosure 1 may be made out of non-magnetic titanium or stainless steel for example.

It may take the form of a small cylindrical tube, with axis XX', having an external diameter of around 5 millimetres and a length of around 25 millimetres. The magnetic detection device 2 and the associated circuits C1, C2, R1, R2 take the form of a multi-chip model or MCM. Said module is inserted into the enclosure 1 allowing the conductor 4 to extend out and, if appropriate, the other conductor 5. The enclosure 1 is then filled with a filling material, such as epoxy resin, in order to interlock everything together.

Figure 9:
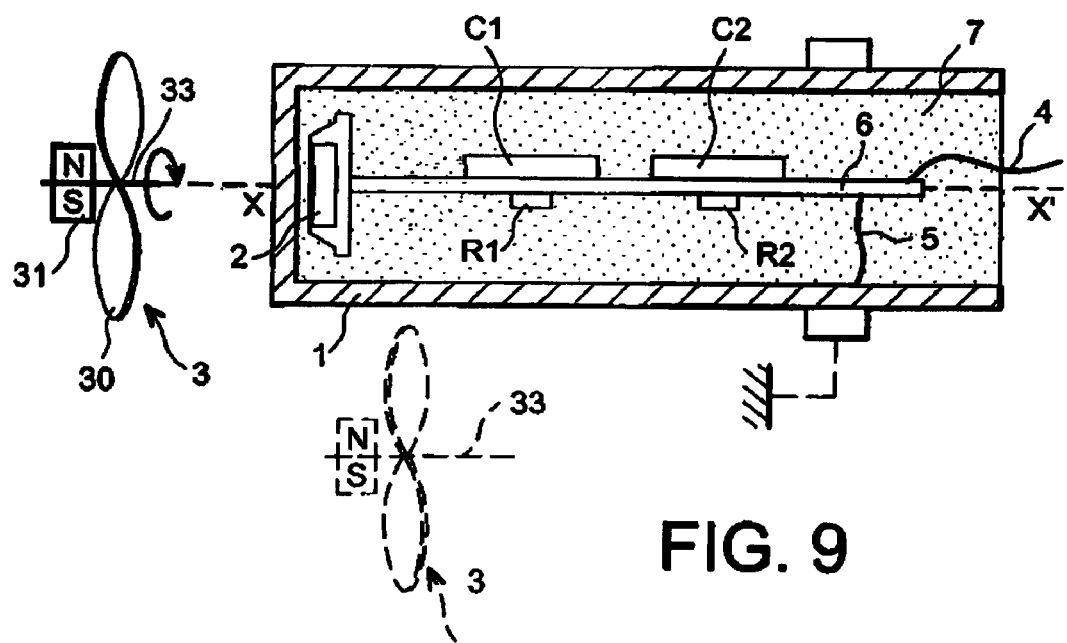
FIG. 9 is a representation of a magnetic system for acquiring data according to the invention, comprising a cross-section of the device for measuring the speed and the direction of rotation in FIG. 1.

FIG. 9 represents a magnetic system for acquiring data in a flow, particularly for hydrocarbon wells. It comprises in cross-section the device for measuring the speed and the direction of rotation according to the invention in its configuration of FIG. 1. The system comprises in addition the object 3 which takes the form of a non-magnetic propeller 30 integral with at least one magnet 31. The magnetic sensor 2, the comparators C1, C2 and the calibration resistors R1, R2 are mounted on a support 6, for example of the flexible printed circuit type. The electrical connections between the angular magnetic sensor 2, the comparators C1, C2 and the calibration resistors R1, R2 are formed on the support 6. The components used (for example the comparators C1, C2), when they are integrated, may be mounted bare on the support 6. The filling material is referenced 7. In order to take up as little space as possible, the two principal faces of the support 6 bear the components. In the example in FIG. 9, the resistors R1, R2 are fixed on one face of the support 6 and the comparators C1, C2 on the other face. The magnetic sensor 2 is located at the end of the support 6. It is fixed substantially perpendicularly to the plane of the support 6.

The object 3 may be located in the extension of the enclosure 1, along the axis of rotation 32, as shown in FIGS. 1, 5, 8A and 9. The axis of rotation 32 of the object and the axis XX' of the enclosure 1 are merged. When the object is positioned as in FIGS. 1, 5, 8A and 9, the distance between the object 3 and the magnetic sensor 2 may be around several millimetres. This distance depends on the sensitivity of the sensor and the intensity of the magnetic field, which is a function of the dimensions of the magnet and its material.

In FIG. 9, we have sought to show that the object 3 may be positioned next to the enclosure 1, their axes 32, XX' are shifted but substantially parallel. The object 3 in this position is shown as a broken line.

Although several embodiments of the present invention have been represented and described in a detailed manner, it will be understood that different changes and modifications may be made without going beyond the scope of the invention.

The invention claimed is:

1. Device for measuring the speed and direction of rotation of a non-magnetic propeller integral with at least one magnet, the propeller being in a flow and being near to where the device is placed, the device comprising:
    a magnetic detection device (2) that delivers, in response to a rotation of the propeller generating a magnetic field variation, signals representative of the propeller's speed and direction of rotation,
    a conductor (4) intended to be connected to a power source to supply current to the magnetic detection device (2) at least,
    a current receptor means (6) placed between the magnetic detection device (2) and the conductor (4) that creates, from signals coming from the magnetic detection device (2), a modulation of the current (Iout) flowing in the conductor (4),
    wherein the frequency of the modulated current (Iout) or the number of transitions that it has reflects the speed of the propeller, and the form of the modulated current (Iout) reflects the direction of rotation of the propeller.

2. Device for measuring the speed and direction of rotation of the propeller according to claim 1, wherein the current receptor means (6) comprises at least one series assembly (61, 62) formed of resistors (R1, R2) and a commutation element (Q5).

3. Device for measuring the speed and direction of rotation of the propeller according to claim 1, wherein the modulated current (Iout) has a first asymmetric form when the propeller turns in one direction and a mirror image of the first asymmetric form when the propeller turns in the other direction.

4. Device for measuring the speed and direction of rotation of the propeller according to claim 1, wherein the magnetic detection device (2) is a linear sensor delivering two pairs of signals out of phase with each other, said signals being relative to the angular position of the propeller.

5. Device for measuring the speed and direction of rotation of the propeller according to claim 4, wherein the modulated current (Iout) has a first asymmetric form when the propeller turns in one direction and a mirror image of the first asymmetric form when the propeller turns in the other direction.

6. Device for measuring the speed and direction of rotation of the propeller according to claim 4, wherein the device comprises two comparators (C1, C2), the input of each receiving the signals of a pair, the output of each comparator (C1, C2) being connected to the conductor (4) via a resistors (R1, R2) of a series assembly, the two resistors (R1, R2) having different values.

7. Device for measuring the speed and direction of rotation of the propeller according to claim 6, wherein each comparator (C1, C2) includes a commutation element (Q5) for the current receptor means (6).

8. Device for measuring the speed and direction of rotation of the propeller according to claim 4, wherein the modulated current (Iout) has a cyclic ratio greater than a predetermined threshold when the propeller turns in one direction and a cyclic ratio less than the predetermined threshold when the propeller turns in the other direction, and wherein the device comprises two comparators (C1, C2), the input of each receiving the signals of a pair, a means of encoding (50) the direction of rotation of the propeller, the input of which is connected to the output of the comparators (C1, C2), means of mixing (51), the input of which is connected to the output of the comparators (C1, C2) and to the output of the means of encoding (50), the output of the means of mixing (51) delivering a unique signal (S) reflecting the speed and direction of rotation of the propeller, said unique signal controlling the current receptor means (6).

9. Device for measuring the speed and direction of rotation of a propeller according to claim 8, wherein the means of mixing (51) and a means of mixing (83) are formed by a circuit based on logic gates (60 to 65, 800 to 805).

10. Device for measuring the speed and direction of rotation of the propeller according to claim 8, wherein the means of encoding (50) the direction of rotation comprises a switchover D.

11. Device for measuring the speed and direction of rotation of the propeller according to claim 1, wherein the magnetic detection device (2) is a digital sensor delivering a signal representative of the speed and a signal representative of the direction of rotation of the propeller.

12. Device for measuring the speed and direction of rotation of the propeller according to claim 1, wherein the modulated current (Iout) has a cyclic ratio greater than a predetermined threshold when the propeller turns in one direction and a cyclic ratio less than the predetermined threshold when the propeller turns in the other direction.

13. Device for measuring the speed and direction of rotation of the propeller according to claim 1, wherein the modulated current (Iout) has a cyclic ratio greater than a predetermined threshold when the propeller turns in one direction and a cyclic ratio less than the predetermined threshold when the propeller turns in the other direction, and wherein the device comprises, means of mixing (83), the input of which is connected to the magnetic detection device (80) and the output of which delivers a unique signal (S) reflecting the speed and direction of rotation of the propeller, said unique signal controlling the current receptor means (6).

14. Device for measuring the speed and direction of rotation of the propeller according to claim 13, wherein the means of mixing (51, 83) are formed by a circuit based on logic gates (60 to 65, 800 to 805).

15. Device for measuring the speed and direction of rotation of propeller according to claim 1, wherein the magnetic detection device (3, 80), the conductor (4) and the current receptor means (6) at least are encapsulated in an enclosure (1) made out of non-magnetic material, the conductor (4) being accessible from the exterior of said enclosure (1).

16. Device for measuring the speed and direction of rotation of the propeller according to claim 15, wherein the enclosure (1) is formed out of metal such as titanium or stainless steel.

17. Device for measuring the speed and direction of rotation of them propeller according to claim 1, wherein the magnetic detection device (3, 80) is connected to another conductor (5) for its power supply, said other conductor (5) coming into electrical contact with the enclosure (1).

18. Magnetic system for acquiring data in a flow, wherein the system comprises a measuring device according to claim 1, and a non-magnetic propeller (30) integral with at least one magnet (31).

19. Magnetic system for acquiring data according to claim 18, wherein the propeller (30) and the measuring device are in the same line as each other, along the axis of the propeller.

\* \* \* \* \*